US00RE44474E

(19) United States
(12) Reissued Patent
Vandewater

(10) Patent Number: US RE44,474 E
(45) Date of Reissued Patent: Sep. 3, 2013

(54) ARROWHEAD WITH PIVOTING BLADE

(75) Inventor: Douglas A. Vandewater, Wyoming, MI (US)

(73) Assignee: EP Hunting LLC, Byron Center, MI (US)

(21) Appl. No.: 13/355,830

(22) Filed: Jan. 23, 2012

Related U.S. Patent Documents

Reissue of:
(64) Patent No.: 8,016,704
Issued: Sep. 13, 2011
Appl. No.: 12/404,836
Filed: Mar. 16, 2009

U.S. Applications:
(60) Provisional application No. 61/038,286, filed on Mar. 20, 2008.

(51) Int. Cl.
*F42B 6/06* (2006.01)

(52) U.S. Cl.
USPC ..... 473/583

(58) Field of Classification Search
USPC ..... 473/583, 584
See application file for complete search history.

(56) References Cited

U.S. PATENT DOCUMENTS

| | | | | |
|---|---|---|---|---|
| 2,568,417 | A * | 9/1951 | Steinbacher | 473/583 |
| 3,000,635 | A * | 9/1961 | Nieman | 473/583 |
| 3,036,395 | A * | 5/1962 | Nelson | 43/6 |
| 3,138,383 | A * | 6/1964 | McKinzie | 473/583 |
| 3,618,948 | A * | 11/1971 | McGlocklin | 473/583 |
| 4,166,619 | A * | 9/1979 | Bergmann et al. | 473/581 |
| 4,940,246 | A * | 7/1990 | Stagg | 473/583 |
| 5,044,640 | A * | 9/1991 | DelMonte et al. | 473/584 |
| 5,102,147 | A * | 4/1992 | Szeluga | 473/584 |
| 5,172,916 | A * | 12/1992 | Puckett | 473/583 |
| 5,286,035 | A * | 2/1994 | Ward | 473/584 |
| 5,564,713 | A * | 10/1996 | Mizek et al. | 473/583 |
| 6,830,523 | B1 * | 12/2004 | Kuhn | 473/583 |
| 7,713,152 | B1 * | 5/2010 | Tentler et al. | 473/583 |
| 2010/0004078 | A1 * | 1/2010 | Flanagan | 473/583 |

OTHER PUBLICATIONS

Printout of website www.bowhunting.net/NewProducts/2004/Barry-GaterXP.html (2 pages).*

* cited by examiner

*Primary Examiner* — John Ricci
(74) *Attorney, Agent, or Firm* — Gardner, Linn, Burkhart & Flory, LLP

(57) ABSTRACT

An arrowhead for use with an arrow in archery includes a body, at least one blade pivotally mounted at the body, and a retaining mechanism disposed at the body. The blade has a cutting edge and a rear edge, with the rear edge having a notch. The blade pivots relative to the body and about a pivot axis between a generally centered position and an angled position. The retaining mechanism engages the notch when the blade is in the centered position, impeding pivotal movement of the blade about the pivotal connection.

23 Claims, 9 Drawing Sheets

ARROWHEAD WITH PIVOTING BLADE

Matter enclosed in heavy brackets [ ] appears in the original patent but forms no part of this reissue specification; matter printed in italics indicates the additions made by reissue.

CROSS REFERENCE TO RELATED APPLICATION

The present application claims the benefit of U.S. provisional patent application Ser. No. 61/038,286 filed Mar. 20, 2008, the disclosure of which is hereby incorporated herein by reference in its entirety.

FIELD OF THE INVENTION

The present invention relates generally to arrows used archery hunting and, more particularly, to arrowheads used in conjunction with archery hunting.

BACKGROUND OF THE INVENTION

It is an aim of hunters to promote a humane kill of an animal. Archery hunters generally kill animals by causing blood loss in the animal. Therefore, it is desirable to provide an arrowhead that promotes maximum penetration into the animal with a large entry wound, thereby increasing the rate of blood loss of a wounded animal to allow for a more humane kill. Additionally, for an archery hunter to be effective and to prevent undue suffering of an animal, the hunter's arrow should travel a straight or substantially straight path to its intended mark, so that the hunter may place his or her shot accurately to rupture vital organs of an animal.

SUMMARY OF THE INVENTION

The present invention provides a pivotable arrowhead for an arrow with an arrowhead body having a substantially pointed portion or tip. The arrowhead includes at least one blade pivotally mounted at the body, with the blade having a substantially sharpened portion or leading edge and a rearwardly or trailing portion or edge. A retaining mechanism is configured to substantially engage a notch in the rear portion of the blade, thereby impeding pivotal movement of the blade about the pivotal connection.

Optionally, the retaining mechanism may include a biasing element that biases or urges an engaging element into the notch to retain the blade and limit or impede pivotal movement of the blade. The biasing element may allow the engaging element to move outward from the notch in response to an initial pivotal movement of the blade, whereby the blade may more freely pivot when the engaging element is withdrawn from the notch.

According to another aspect of the present invention, an arrowhead includes a pair of blades pivotally and movably received in a channel or slot formed in a body and mounted to the body via a pivot pin and a guide pin. The blades engage a pivot-limiter movably disposed at the channel or slot and are thereby substantially locked relative to one another when in either a deployed position or undeployed position. A retaining mechanism, including the pivot-limiter, is adapted to limit the range of pivotal movement of the blades when they are in the deployed position.

Therefore, the present invention provides a broadhead arrowhead that has a broad pivotal blade pivotally mounted to an arrow body. The arrowhead limits pivotal movement of the blade until one side of the blade encounters an object whereby the force of impact is sufficient to overcome a biasing force that retains the blade in its initial or centered position, whereby the blade may more freely pivot. Thus, the arrowhead may penetrate an animal and may continue penetration after impacting a bone with the blade by allowing the blade to pivot upon impact with the bone structure and thus allowing the arrowhead to continue penetration to one side of the bone structure.

These and other objects, advantages, purposes and features of the present invention will become apparent upon review of the following specification in conjunction with the drawings.

DESCRIPTION OF THE PREFERRED EMBODIMENTS

Figure 1:
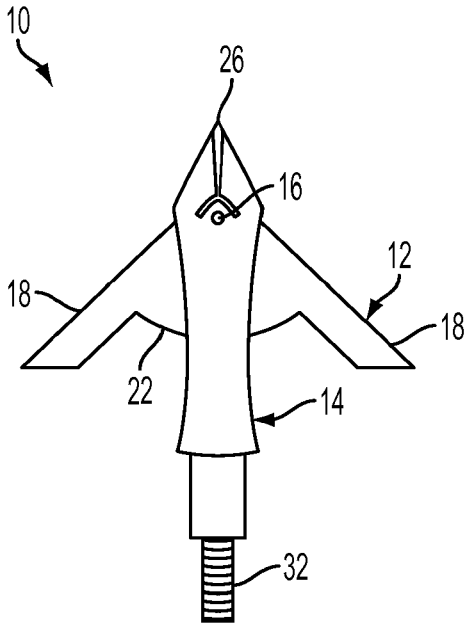
FIG. 1 is a side elevation of an arrowhead with a pivoting blade in accordance with the present invention.
Figure 2:
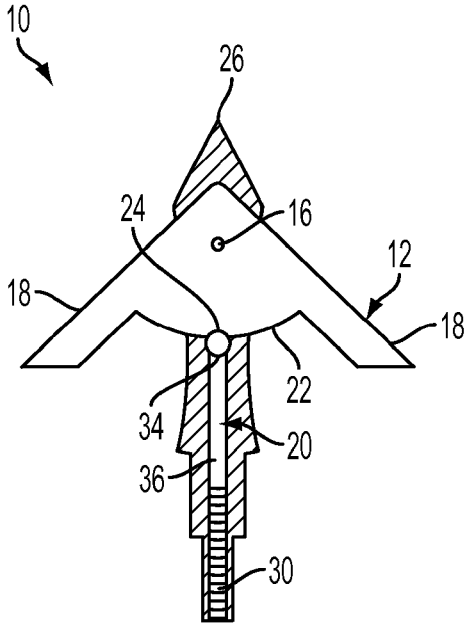
FIG. 2 is a side elevation and partial sectional view of the arrowhead of FIG. 1.
Figure 3:
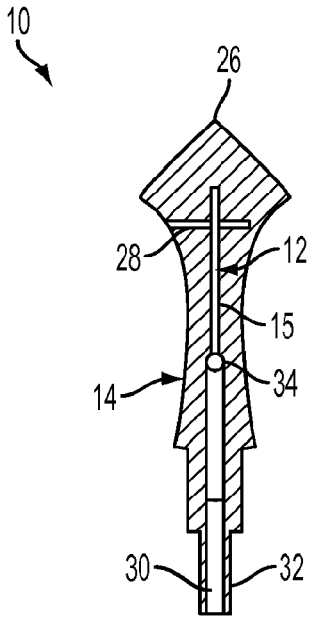
FIG. 3 is a another sectional view of the arrowhead of FIG. 1.

Referring now to the drawings and the illustrative embodiments depicted therein, an archery hunting device or arrowhead 10 includes a blade 12 that is pivotally mounted at a body 14 and is pivotable about a pivot pin or axis 16 (FIGS. 1-3). Blade 12 pivots between a first or center position and a second or angled position in response to contact or impact or engagement of a blade edge 18 with an object, such as bone, cartilage, or the like, in a target animal. A retaining mechanism 20 is biased or urged against a rear edge or portion 22 of blade 12 to resist such pivotal movement unless and until the force acting against a side region of the blade edge 18 is sufficient to overcome a biasing force of the retaining mechanism and cause the blade to pivot. Thus, arrowhead 10 will minimally impede travel of an arrow through an animal after encountering bone or cartilage (by allowing the blade to pivot to allow the arrowhead to continue its penetration into the animal at a side of the encountered or impacted bone structure), thereby resulting in a deeper wound cavity for a more humane kill.

In the illustrated embodiment, body 14 has an elongated shape, such as a cylindrical shape, and may have a substantially pointed portion or tip 26. Body 14 may have a slot or passageway 15 (FIG. 3) for receiving blade 12 and to allow passage of blade 12 through body 14 during assembly. Slot 15 may be located substantially coincident with the longitudinal axis of body 14 to promote balanced flight and accuracy of arrowhead 10. Further, body 14 may include a biasing element passageway and internally threaded portion 30 for receiving retaining mechanism 20 (discussed below) and a pin passageway for receiving pivot pin 16. Optionally, the pin passageway may include a passageway or threaded bore 28 to accept a threaded pivot pin 16 or, alternatively, may be adapted to receive pivot pin 16 by a press-fit or interference-fit or the like.

Body 14 may further include an externally threaded portion 32 for connection to an arrow shaft. In such a configuration, arrowhead 10 may be used as an arrowhead attached to a conventional arrow shaft or bolt for use with a bow or crossbow. Optionally, it is envisioned that arrowhead 10 may be unitarily formed with or otherwise attached to a shaft of an arrow, while remaining within the spirit and scope of the present invention.

As best seen in FIG. 2, blade 12 has one or more substantially sharpened cutting front portions or edges or faces 18 and a rear edge 22 with a notch 24, and includes an aperture adapted to facilitate pivotable connection to body 14 with pivot pin 16. Blade 12 is positioned at body 14 and through slot 15. Thus, the thickness of blade 12 is selected to be sufficiently thin as to allow the blade to fit in the slot during assembly of the arrowhead and to pivot therein when in use, as discussed below. In the illustrated embodiment, blade 12 has two substantially symmetrical sharpened side portions or wings for balanced flight and to provide a large cutting surface (which will promote a large wound cavity). Notch 24 is located at rear edge 22 opposite cutting edges 18 and may be centrally located so as to be substantially equidistant from the ends of rear edge 22. By centrally locating notch 24, the blade is centered when notch 24 is engaged with retaining mechanism 20, thereby promoting straight and accurate flight of the arrowhead.

In the illustrated embodiment, retaining mechanism 20 includes an engaging element, such as a ball bearing 34, that is urged toward notch 24 by a biasing element 36. Biasing element 36 is disposed within arrowhead body 14 and engages ball bearing 34, and may be set to a compressed state by threadably connecting a set screw (not shown) to internally threaded portion 30 of body 14, whereby biasing element 36 is disposed between the set screw and the ball bearing 34. Biasing element 36 may comprise any suitable element or material for urging ball bearing 34 toward notch 24, such as, for example, a conventional spring-steel compression spring, or an elastomeric material such as rubber or the like. However, skilled artisans will recognize that other methods of urging ball bearing 34 toward notch 24 can be utilized without departing from the principles of the present invention.

When blade 12 is set or positioned in its initial or centered position, ball bearing 34 is urged into notch 24 to substantially retain blade 12 in its initial or centered position. When a force is applied to one of the side portions or wings or edges of the blade that is greater than a force applied to the other side portion or wing or edge of the blade, and when such an imbalance in forces is sufficient to overcome the force exerted by biasing element 36, ball bearing 34 will be urged downward by pivotal movement of blade 12 and out of notch 24, whereby blade 12 will pivot in a direction away from the side at which the greater force is applied.

Optionally, the retaining mechanism may have a biasing element that biases a bearing or other engaging element toward the tip or point or leading portion of the arrowhead body. For example, a blade otherwise substantially similar to blade 12 may have a notch positioned at the tip or point or forward portion of the blade, and a ball bearing or other suitable engaging element may be biased into the notch to engage the notch, thereby limiting pivotal movement of the blade until the biasing force is overcome and the bearing is forced out of the notch, such as in a similar manner as discussed above. Such a retaining mechanism may be used in addition to, or in lieu of, retaining mechanism 20 and notch 24 (described above).

In addition to holding blade 12 in a centered position relative to body 14, retaining mechanism 20 may also function to dampen pivotal movement of blade 12. As the amount of force exerted by biasing element 36 on ball bearing 34 increases (such as when ball bearing 34 is urged out of notch 24 by pivotal movement of the blade), ball bearing 34 may act to impede or limit pivotal movement of blade 12 (even after ball bearing 34 has been forced out of notch 24). Thus, a desired resistance to pivotal movement can be achieved by selecting a biasing element 36 capable of delivering a desired amount of force and damping.

Pivotal movement or resistance to pivotal movement of blade 12 may be limited or controlled by the configuration of rear edge 22 and/or spring force and/or engagement of the ball bearing 34 with the blade. For example, pivotal movement of blade 12 and/or resistance to such pivotal movement of blade 12 may be controlled or adjusted by altering the shape or configuration of rear edge 22. Accordingly, if rear edge 22 has a substantially constant radius of curvature, the radius of such a circle may have an origin at the pivot axis of the blade, or the origin of the circular profile may be located longitudinally toward or away from the rear edge of the blade with respect to the pivot axis, in order to influence pivotal movement of the blade when the blade is not in its initial or centered position (such as, for example, biasing the blade toward or away from its centered position). Rear edge 22 may also take non-circular or non-arcuate forms, such as a linear or angular profile, for providing the desired or appropriate pivotal characteristics of blade 12, depending on the particular application and desired performance characteristics of the arrowhead.

During assembly of arrowhead 10, blade 12 is attached to body 14 by pivot pin 16 or other pivot connection. Such pivot connection may be made with a set screw or other threaded connector attached to threaded bore 28. Optionally, the pivot connection may be an interference-fit pin, cotter, or other such device as will be apparent to the skilled artisan. Ball bearing 34 is placed in the biasing element passageway of body 12 with biasing element 36 being disposed in the passageway below ball bearing 34. A set screw may then be threadably connected to the body via internally threaded portion 30, and may be tightened against the force of biasing element 36 until a desired tension or biasing force at ball bearing 34 is achieved. Finally, the arrowhead assembly 10 may be attached to a bolt or arrow by externally threaded portion 32 or via other connection means or the like.

When the arrow is fired and during its flight, retaining mechanism 20 cooperates with notch 24 to hold blade 12 in its centered position relative to body 14, thereby maintaining a substantially even weight distribution about the longitudinal axis of body 14 for balanced flight and accuracy. When arrowhead 10 finds its mark on the animal being hunted, the centered position of blade 12 is maintained until one wing or side of blade 12 encounters a harder material than the material encountered by the other wing or side. Such differential hardnesses encountered by the respective wings of the blade creates a rotational force that may overcome the biasing force of retaining mechanism 20 at notch 24, thereby allowing blade 12 to pivot about pivot pin 16. For example, one wing may impact a bone in the ribcage of an animal, while the other wing may pass through the space between two ribcage bones. In such a situation, the blade pivots such that the wing contacting bone pivots to clear the bone, thereby reducing or minimizing the loss of the arrow's kinetic energy as a result of the impact and facilitating further penetration of the arrowhead. During such pivoting, ball bearing 34, after being dislodged from notch 24, traces rear edge 22 as the blade pivots toward one side or the other. The pivoting of blade 12 allows arrowhead 10 to continue its path into the animal, rather than slowing or stopping as a result of resistance encountered by one side of the blade as it hits bone or cartilage.

Thus, arrowhead 10 achieves deeper penetration into the animal than it otherwise would absent the pivoting of blade 12. Deeper penetration, in turn, results in a larger wound cavity and a faster rate of bleeding of the animal and a more humane kill. Once past the bone or cartilage or object, the blade may pivot back toward its center position as the other wing then encounters a greater resistance than the first blade wing (which was pivoted to be generally along the arrowhead after impact with the bone or the like). In addition, the arrowheads are durable, and are capable of being reset to their centered position and reused many times before parts fail from wear. This is because the ball bearing, being preferably made of a hard, durable substance (such as steel or other suitable material), will not wear out or degrade by the small amount of movement of the blade relative to the ball bearing, such that the arrowhead may be re-used multiple times without adverse affects on its performance. Moreover, the arrowhead may be produced with little or no degradable materials such as rubber or plastic, thereby enhancing the durability and longevity of the arrowhead even in harsh outdoor environments.

Figure 4:
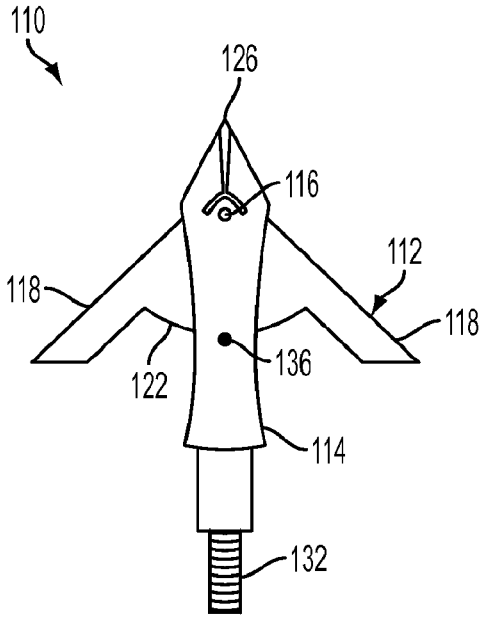
FIG. 4 is a side elevation of another arrowhead with a pivoting blade in accordance with the present invention.
Figure 5:
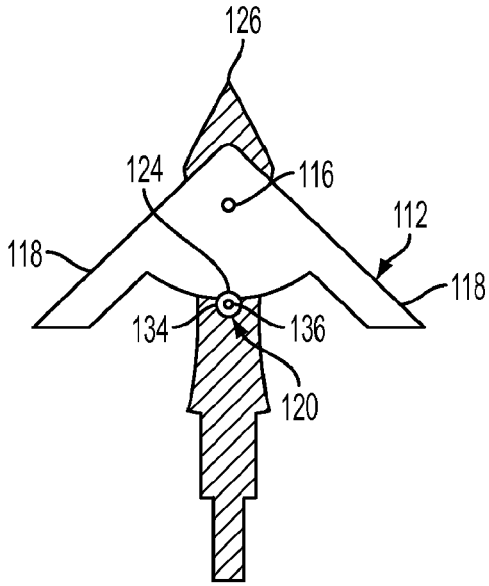
FIG. 5 is a side elevation and partial sectional view of the arrowhead of FIG. 4.
Figure 6:
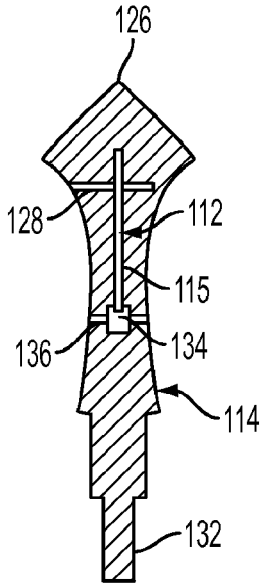
FIG. 6 is another sectional view of the arrowhead of FIG. 4.
Figure 7:
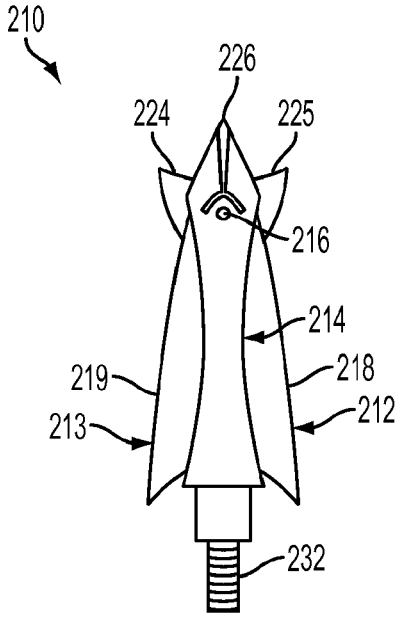
FIG. 7 is a side elevation of another arrowhead with pivoting blades in accordance with the present invention, shown with the blades in a folded position.

Referring now to FIGS. 4-6, an archery hunting device or arrowhead 110 includes a wheeled retaining mechanism 120 for retaining a blade 112 in a centered position. Similar to arrowhead 10, blade 112 of arrowhead 110 is pivotally mounted at a body 114 within a slot 115 and is pivotable about a pivot pin or axis 116. The blade 112 includes one or more sharpened portions 118 and notched rear edge 122. Body 114 may include a pointed portion 126 and a pivot passageway or bore 128, such as a threaded passageway or the like, and an externally threaded portion 132. Arrowhead 110 may be generally similar to arrowhead 10, discussed above, such that a detailed discussion of the arrowheads need not be repeated herein. The similar components are referenced in FIGS. 1-3 and 4-6 with like reference numbers, but with the reference numbers of FIGS. 4-6 having 100 added thereto.

In the illustrated embodiment, retaining mechanism 120 includes a wheel 134 configured to rotate about pivot pin 116 as blade 112 pivots. Wheel 134 allows for pivotal movement of blade 112 by compressing of wheel 134 or movement of wheel 134 away from blade 112 or both. For example, wheel 134 may be made of a flexible material, such as rubber, elastomeric material or the like, such that wheel 134 may compress to allow the wheel to move out of notch 124 to allow the blade to pivot. Optionally, the wheel may be connected to a linear retaining mechanism or biasing element, such as in a similar manner as discussed above with respect to retaining mechanism 20, to facilitate displacement of the wheel away from notch 124. Retaining mechanism 120 may further include a bearing or bushing (not shown) to aid in smooth rotation of wheel 134. Such bearing or bushing may be any suitable bearing or device for easing rotation of wheel 134, such as, for example, a ball bearing, a bronze oilite-type bushing or the like, as will be apparent to the skilled artisan.

During assembly, wheel 134 may be pivotably attached to body 114 by an axle 136. Axle 136 may, for example, be a set-screw, cotter pin, press-fit pin, or the like. Retaining mechanism 120 may be located in a slot or passageway in body 114, thereby substantially centering wheel 134 with respect to body 114 for balance (see FIG. 6). After assembly, arrowhead 110 may be connected to an arrow or used as a projectile as described above. When fired and during flight, blade 112 is in an initial centered position wherein wheel 134 is at and partially in notch 124. When force is exerted at blade edge 118, as when one wing of the blade 112 encounters a harder material than the material encountered by the other wing, wheel 134 may be compressed or displaced by such force differential whereby blade 112 may then pivot, such as in a similar manner as described above.

In addition to holding blade 112 in a centered position relative to body 114 (such as during flight), retaining mechanism 120 may be used to dampen pivotal motion of blade 112. For example, if the resilience of the material used for wheel 134 is increased, it may act to impede pivoting of blade 112 even after wheel 134 has been forced out of notch 124. Also, the presence or absence of a ball bearing or bushing may affect how freely wheel 134 rotates and, thus, how freely blade 112 pivots. Thus, a desired resistance to pivotal movement of blade 112 can be achieved by selecting a material for wheel 134 that is capable of delivering a desired or appropriate amount of force, and/or selecting or omitting a bushing or bearing to promote or impede rotation of wheel 134.

Referring now to FIGS. 7-12, an archery hunting device or arrowhead 210 includes a first blade 212 and a second blade 213 pivotally mounted at a body 214 and pivotable about a pivot pin or axis 216. Arrowhead 210 may otherwise be substantially similar to arrowhead 10, discussed above, such that a detailed discussion of the arrowheads need not be repeated herein. The similar components are referenced in FIGS. 1-3 and 7-12 with like reference numbers, but with the reference numbers of FIGS. 7-12 having 200 added thereto.

Figure 10:
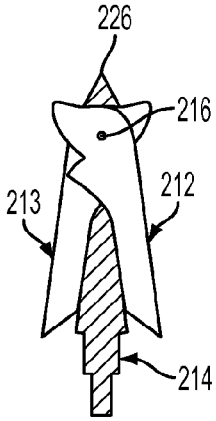
FIG. 10 is a partial sectional view of the arrowhead of FIGS. 7-9, shown with the blades in the folded position.
Figure 10A:
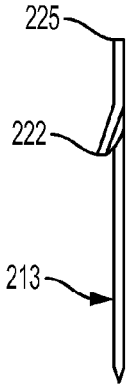
FIG. 10A is a side elevation view of a blade shown in FIG. 10.
Figure 10B:
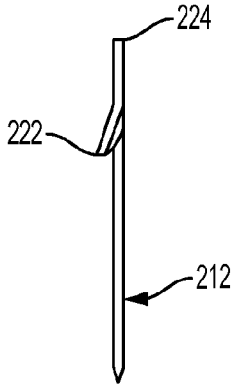
FIG. 10B is a side elevation view of another blade shown in FIG. 10.
Figure 11:
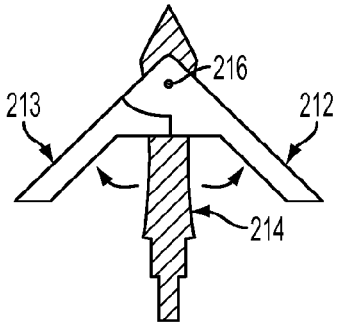
FIG. 11 is another partial sectional view of the arrowhead of FIGS. 7-9, shown with the blades in the deployed position.
Figure 12:
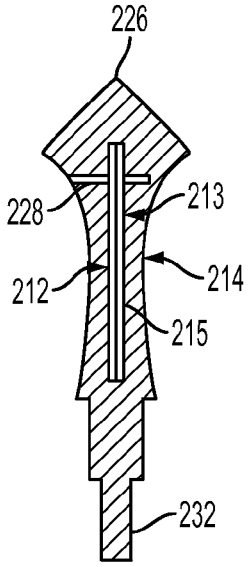
FIG. 12 is another sectional view of the arrowhead of FIG. 7.

Body 214 may include a pointed portion 226, a passageway or threaded bore 228, and an externally threaded portion 232, similar to body 14, but may further include a wider slot 215 to accommodate at least two overlapping blades (FIG. 12). First blade 212 and second blade 213 each have at least one substantially sharpened portion or edge 218 and 219, respectively, and each includes an aperture adapted to facilitate pivotable connection to body 214 with pivot pin 216. Each blade may include an interlocking tab 222 that lock the blades in a deployed position. As best seen in FIGS. 10-10B, the interlocking tabs may comprise non-planar portions or curved or turned portions of the otherwise planar blades with the tabs 222 extending toward the other adjacent blade, such that when first blade 212 and second blade 213 pivot or open sufficiently, the non-planar portion or tab of the first blade snaps over the edge or non-planar portion or tab of the second blade, thereby substantially interlocking the two blades to form a substantially unitary whole blade. When so interlocked, the two blades may pivot together about pivot pin 216 in the manner of a single blade. First blade 212 and second blade 213 may be substantially identical to promote manufacturing efficiency and cost effectiveness.

Figure 8:
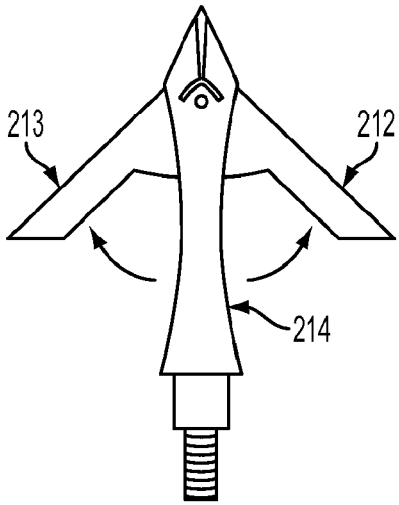
FIG. 8 is another side elevation of the arrowhead of FIG. 7, shown with the pivoting blades in the deployed position.
Figure 9:
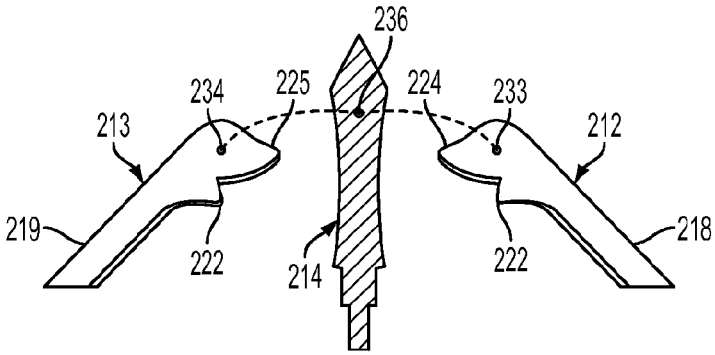
FIG. 9 is an exploded partial sectional view of the arrowhead of FIG. 7.

In the illustrated embodiment, first blade 212 has a first opening lever 224 configured to convert the force of impact with an object, such as an animal, into pivotal motion of first blade 212 toward its open position (FIG. 8). Second blade 213 may be configured similar to first blade 212, with a second opening lever 225 configured to translate the same or similar force employed in pivoting first blade 212 into pivoting of second blade 213 toward its deployed position. Thus, arrowhead 210 may be fired with blades 212, 213 in a folded or closed position, as discussed below. When the arrowhead impacts an animal, the flesh of the animal pushes against levers 224, 225, thereby pivoting the blades to an open or unfolded position. Further, because the opening of the blades occurs substantially immediately upon impact, the expanded wound cavity resulting from the opened blades (discussed below) runs along substantially the entire depth of the wound.

First blade 212 and second blade 213 may overlap in a folded or centered or aligned position (FIG. 10) and may shift to a deployed position (FIG. 11), wherein first blade 212 and second blade 213 may interlock to hold or lock the blades in the deployed position. Once interlocked, the blades, acting as a unitary whole, may be acted upon by a retaining mechanism to generally retain the blades in a centered position (as discussed below). The pivot connection between blades 212 and 213 and body 214 allows the blades to fold or deploy and to pivot after deployment, and may be made with a set screw or other threaded connector or the like. Alternatively, the pivot connection may be established with an interference-fit pin, cotter pin, or other such device, as will be apparent to the skilled artisan.

Thus, while arrowhead 210 is in flight, first blade 212 and second blade 213 may be in a folded position (FIG. 7) to minimize the frontal area of the blades, thereby reducing wind drag and the potential for accuracy-degrading aerodynamic imperfections and helping the arrowhead fly like a field point, i.e. an arrowhead with no affixed blades. Upon impact with an object such as an animal, first blade 212 and second blade 213, responding to forces exerted on first opening lever 224 and second opening lever 225, respectively, pivot to a deployed position (FIG. 8), thereby forming a broad cutting blade for promoting an increased rate of bleeding and a more humane kill. Further, when in the deployed position, the interlocked blades may pivot about pivot point 234 relative to the arrowhead body, such as in a similar manner as described above.

Optionally, a retaining mechanism (not shown in FIGS. 7-12) may also be utilized with arrowhead 210, such as a biasing element with a ball bearing or a spring wheel in accordance with retaining mechanisms disclosed herein. If a retaining mechanism is employed, first blade 212 and second blade 213 may each comprise a notched portion of a rear edge (not shown) to create a rear edge substantially similar to those described above when in the deployed position. The retaining mechanism may retain the blades in their folded or aligned positions to provide a straighter flight, and/or the retaining mechanism may retain the blades in a centered position when in their deployed position. Thus, such a retaining mechanism could act to retain the blades in a centered deployed position until one blade encounters a material harder than the other blade encounters, as described in detail above.

Figure 13:
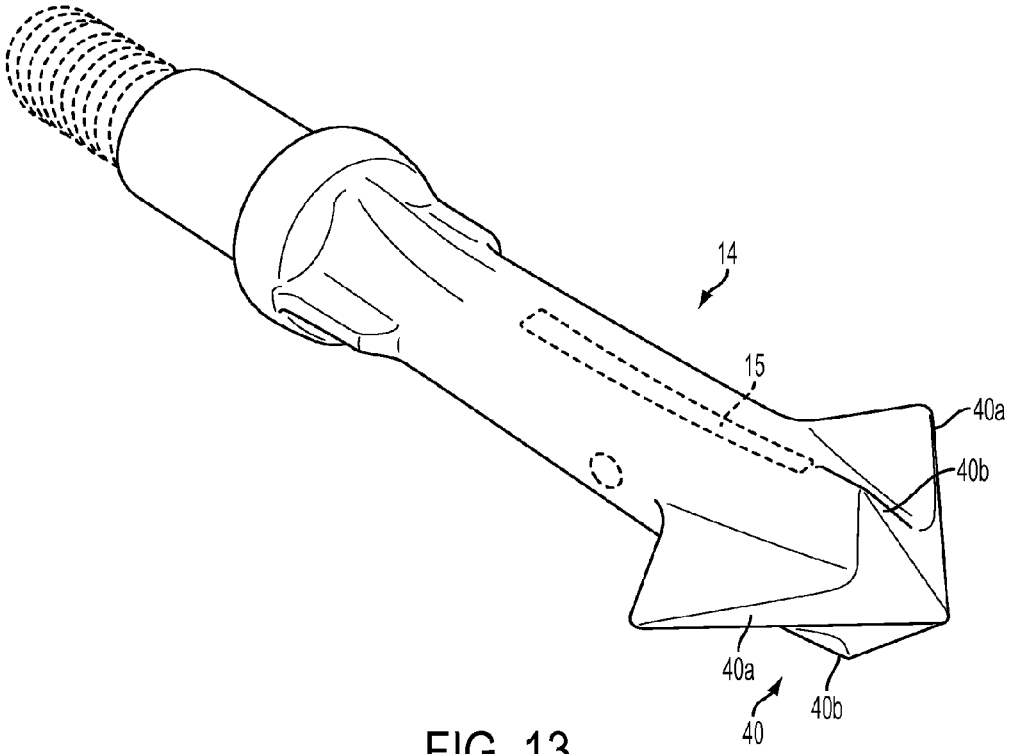
FIG. 13 is a perspective view of an arrowhead body in accordance with the present invention.
Figure 14:
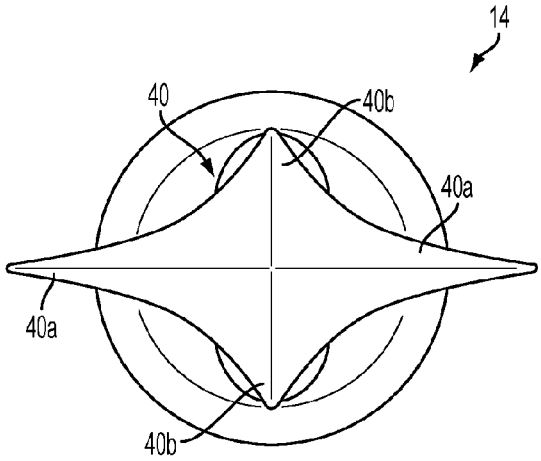
FIG. 14 is an end elevation of the arrowhead body of FIG. 14.
Figure 15:
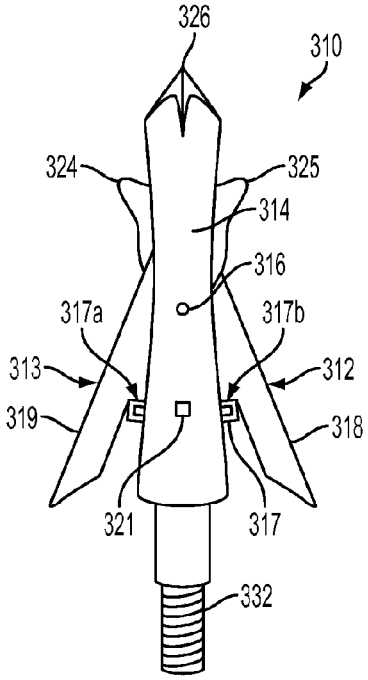
FIG. 15 is a side elevation of another arrowhead with pivoting blades in accordance with the present invention, shown with the blades in a retracted or undeployed position.

In any of the illustrated embodiments, and as shown in FIGS. 13 and 14, the arrowhead body 14 may include a tip portion 40 that has a wider flared section 40a and a narrower flared section 40b each extending outwardly from opposed sides of the arrowhead body, and with the wider flared section 40a extending further from the arrowhead body than the narrower flared section 40b. The narrower and wider flared sections are generally normal to one another, forming a star-shaped or diamond-shaped cross section at the flared portions. The outward extension of the blade or blades (not shown in FIGS. 13 and 14) received in the slot 15 may generally coincide with the narrower flared section, so that the portion of the wound cavity created by the wider flared section is normal to the portion of the wound cavity created by the blade or blades. Therefore, the size of the wound cavity is enhanced by the flared portions of the arrowhead. Further, the large frontal area formed by the flared sections transfers a substantial amount of kinetic energy to the animal upon impact prior to the cutting action of the blade.

Therefore, the function of the pivoting or pendulum blade allows for a large wound cavity with deeper penetration because the blade will pivot upon contact with bone or harder tissue. This allows an arrow equipped with the arrowhead disclosed herein to pass through the animal with less resistance and without being jolted off its intended course. This provides enhanced penetration for increased bleeding of the animal, and therefore results in an efficient kill. With the pivoting of the blade, there may be little or no loss in accuracy because the retention mechanism ensures the blade will stay at a centered position during flight, thereby limiting problems that may arise from an unbalanced arrowhead. With two pivotable blades, the flight characteristics can be improved still further, providing for a more aerodynamic arrowhead with the same or nearly the same potential for a large wound cavity associated with the single-blade embodiments.

Referring now to FIGS. 15-20, an archery hunting device or arrowhead 310 includes a first blade 312 and a second blade 313 pivotally mounted at a body 314 and pivotable about a pivot pin or axis 316. A blade retaining mechanism including a guide element or pivot-limiter 317 is received in a slot or channel 315 of body 314 that accommodates overlapping blades 312, 313. Pivot-limiter 317 is movably disposed within the slot and retained within the slot 315 via a guide pin 321. Arrowhead 310 may be substantially similar to arrowhead 210, discussed above, such that a detailed discussion of the arrowheads need not be repeated herein. The similar components are referenced in FIGS. 7-12 and 15-20 with like reference numbers, but with the reference numbers of FIGS. 15-20 having 100 added thereto.

Figure 19:
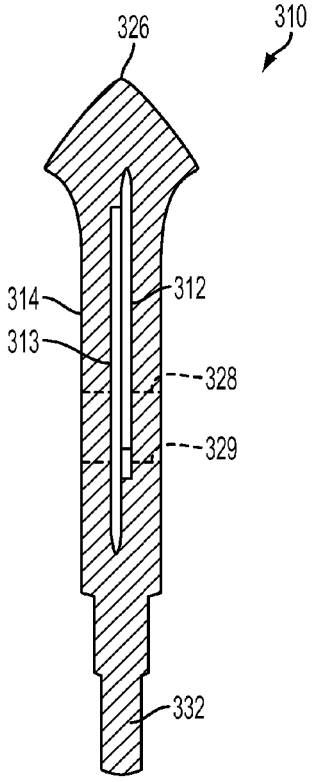
FIG. 19 is a side elevation of the arrowhead shown in FIG. 15.
Figure 20:
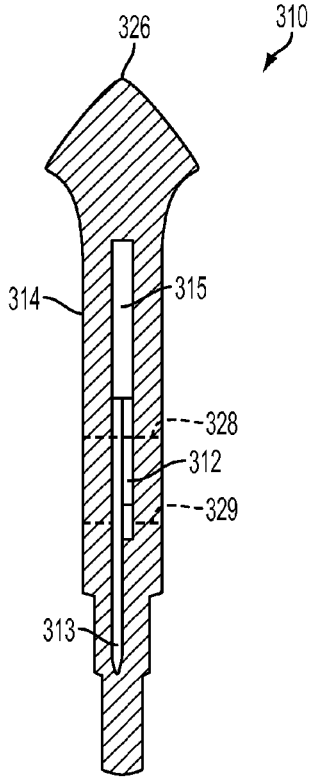
FIG. 20 is a side elevation of the arrowhead shown in FIG. 16.

Body 314 may include a pointed or tip portion 326 (such as similar to tip portion 40), a passageway or threaded bore 328 (FIGS. 19 and 20) for receiving pivot pin 316, another passageway or threaded bore 329 for receiving guide pin 321, an externally threaded base or attachment portion 332, and slot 315 to accommodate at least two overlapping blades. As shown in FIGS. 19 and 20, the slot 315 is configured to receive the blades 312, 313 in a stacked or overlapping orientation so that the blades are movable within the slot relative to the body and to one another as they move from an undeployed position to a deployed position, as discussed below. The slot is also configured to movably receive the pivot-limiter therein whereby the pivot-limiter is movable within the slot with the blades as they move or pivot together when in their deployed position, as also discussed below.

Figure 17:
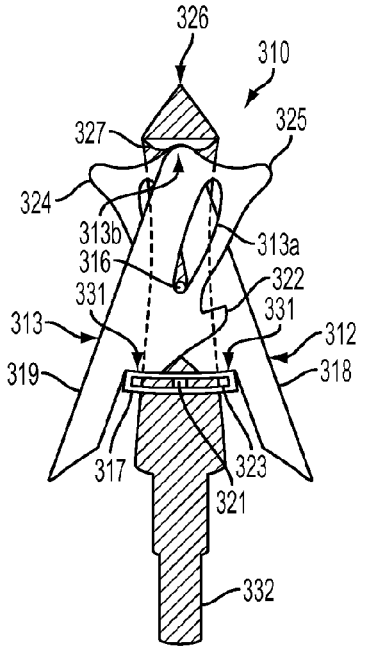
FIG. 17 is a partial sectional view of the arrowhead of FIGS. 15-16, shown with the blades in the undeployed position.

First blade 312 and second blade 313 each have at least one substantially sharpened portion or edge 318 and 319, respectively, and each includes an elongate aperture 312a, 313a that is configured to facilitate pivotable and movable or slidable connection to body 314 via pivot pin 316. Each blade includes a shelf region 331 that rests against the forward or leading surface of pivot-limiter 317 when the blades are in an undeployed state (FIG. 17). Shelf regions 331 may be somewhat arcuate in shape to match the shape of the upper surface of the pivot-limiter and retain the blades relative to the pivot-limiter when the blades are in the undeployed state. Optionally, the shelf regions may be frictionally held against the upper surface of the pivot-limiter by a resilient member 327, as described below. Each blade also includes a locking tab 322 that engages pivot-limiter 317 to lock the blades in a deployed position, as discussed below. First blade 312 and second blade 313 may be substantially identical to promote manufacturing efficiency and cost effectiveness.

Figure 16:
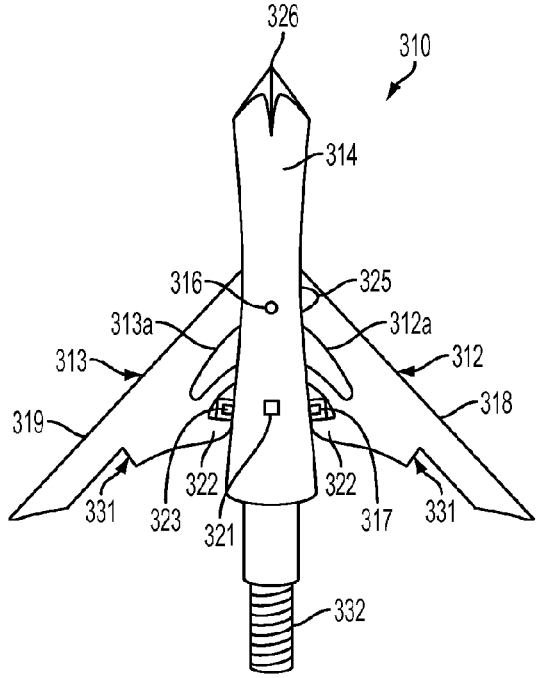
FIG. 16 is another side elevation of the arrowhead of FIG. 15, shown with the pivoting blades in a deployed position.

In the illustrated embodiment, a first opening lever 324 of first blade 312 is configured to convert the force of impact with an object, such as an animal, into pivotal motion of first blade 312 toward its open position (FIG. 16). Second blade 313 may be configured similarly to first blade 312, with a second opening lever 325 configured to translate the same or similar force employed in pivoting first blade 312 into pivoting of second blade 313 toward its deployed position. Thus, arrowhead 310 may be fired with blades 312, 313 in a folded or closed or undeployed position. When the arrowhead impacts an animal, the flesh of the animal pushes against levers 324, 325, which urges the blades in the aft direction to disengage the shelves 331 from the pivot-limiter, thereby allowing the blades to pivot to an open or unfolded or deployed position, as discussed below.

Figure 18:
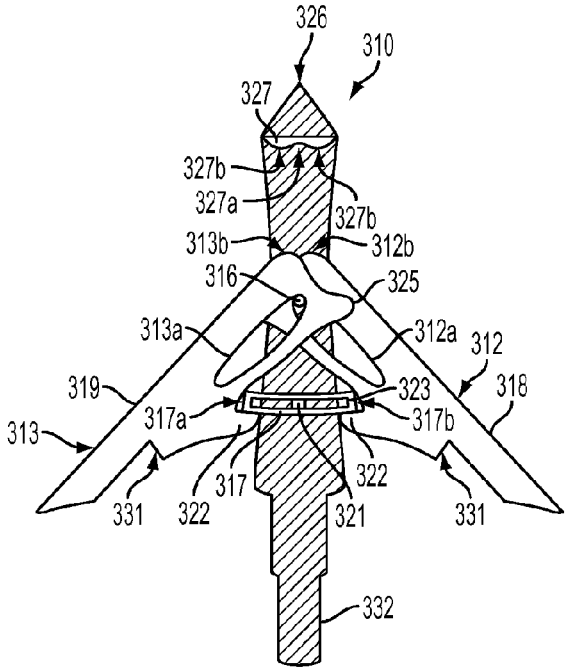
FIG. 18 is another partial sectional view of the arrowhead of FIGS. 15-17, shown with the blades in the deployed position.

Blades 312, 313 are configured to be initially retained in an undeployed state (FIGS. 15, 17, and 19), with the blades oriented generally along the body with their opening levers 324, 325 flared partially outward at the tip portion of the body. When the arrowhead 310 strikes a target, such as an animal, the front portions may contact the object and cause the blades to move along the body (such as in an aft direction) while the blades move and pivot to their deployed position. The aft motion combined with pivoting motion of the blades during deployment is facilitated by the elongated curved or arcuate shapes of apertures 312a, 313a in blades 312, 313, which permit pivot pin 316 to travel along the respective apertures from the aft ends of the apertures in the undeployed state (FIGS. 15 and 17) to the forward ends of the apertures in the deployed state (FIGS. 16 and 18). Once the blades are in the deployed state, their respective locking tabs 322 engage opposite end portions 317a, 317b of pivot-limiter 317 and are capable of pivoting about pivot pin 316 (which is positioned at the forward ends of the apertures 312a, 313a of the blades) to the extent permitted by guide pin 321 in channel 323.

As best seen in FIGS. 16 and 18, locking tabs 322 of blades 312, 313 may comprise projections along opposite edges from the sharpened edges and extending generally toward body 314 when blades 312, 313 are deployed. When first blade 312 and second blade 313 pivot or open sufficiently, the locking tab of each blade snaps over a respective side of pivot-limiter 317, thereby substantially locking the two blades in their deployed configuration to form a substantially unitary whole blade that moves with pivot-limiter 317. When so locked, the two blades may pivot together about pivot pin 316 in the manner of a single blade (such as described above with respect to blade 10).

Pivot-limiter 317 is movably received in channel 315 of body 314 and defines a channel or slot or guide 323 having a generally arcuate shape with a radius of curvature approximately equal to the distance between guide pin 321 and pivot pin 316. Pivot-limiter 317 is movable in a side-to-side manner along guide pin 321 and has opposed end portions 317a, 317b that are contacted by guide pin 321 to limit the extent of travel of pivot-limiter 317 in either direction within slot 315. Optionally, guide pin 321 is semi-rectangular with a thickness or diameter corresponding to generally the width of channel 323 and an arcuate shape corresponding to the radius of curvature of the channel, thus permitting pivot-limiter 317 to move or slide along guide pin 321, but substantially without pivoting or rotating about the guide pin.

First blade 312 and second blade 313 may overlap in a folded or centered or aligned position (FIGS. 15, 17, and 19) and may shift to a deployed position (FIGS. 16, 18, and 20), wherein locking tabs 322 of first blade 312 and second blade 313 engage pivot-limiter 317 to hold or lock the blades in the deployed position. Once locked, the blades, acting as a unitary whole with pivot-limiter 317, are free to pivot to the extent allowed by guide pin 321, which travels in channel 323 of pivot-limiter 317. The pivot connection between blades 312, 313 and body 314 (at pivot pin 316) allows the blades to fold or deploy and to pivot after deployment, and may be made with a set screw or other threaded connector or the like. Alternatively, the pivot connection may be established with an interference-fit pin, cotter pin, or other such device, as will be apparent to the skilled artisan.

Optionally, and as shown in FIGS. 17 and 18, a retainer such as a resilient element or member 327 positioned in slot 315 aft of pointed portion 326 may also be utilized with arrowhead 310 to resist inadvertent, premature, or undesirable deployment of blades 312, 313. Resilient member 327 is compressible and may include a concave region 327a that engages convex regions 312b, 313b of blades 312, 313 adjacent opening levers 324, 325 when the blades are in the undeployed position. The resilient member is somewhat compressed or deformed when the blades are undeployed to urge shelf regions 331 against the upper or leading surface of pivot-limiter 317 and frictionally retain the blades in their folded or aligned positions. This provides a straighter flight of an arrow equipped with arrowhead 310 until one or both opening levers 324, 325 encounter resistance or a solid material, causing blades 312, 313 to begin to pivot while further deforming convex portions 327b of resilient member 327 on either side of concave region 327a and causing shelf regions 331 to slide along the upper or leading surface of pivot-limiter 317 as described above.

As forces are applied to the opening levers 324, 325, the blades begin to pivot in response to these forces, but do not initially move aft because pivot-limiter 317 substantially prevents them from doing so until the blades pivot to an extent that the shelf regions disengage the upper or leading surface of the pivot-limiter. The shape of the slots allow for pivotal movement of the blades until the shelf regions are disengaged from the pivot-limiter, whereby the slots allow for aft movement and pivotal movement of the blades relative to the body and pivot pin. Once shelf regions 331 disengage the leading surface of pivot-limiter 317, the blades continue to pivot outward and begin to move or slide aft in slot 315 toward their fully-deployed configuration. When the blades are fully deployed, the locking tabs engage the pivot-limiter to substantially lock the blades in the deployed position. The blades 312, 313 then pivot about pivot pin 316 as pivot-limiter 317 moves along guide pin 321. The length or lateral extent of pivot-limiter 317 and channel 323 defines the outer travel limits of the blades when they are in the deployed position, where the longer the pivot-limiter and channel are, the greater the extent of pivoting travel available to blades 312, 313. Thus, the length of pivot-limiter 317 and channel 323 may be selected to have either more or less pivoting travel available according to the needs for a particular application.

Thus, while arrowhead 310 is in flight, first blade 312 and second blade 313 may be in a folded position (FIGS. 15 and 17) to minimize the frontal area of the blades, thereby reducing wind drag and the potential for accuracy-degrading aerodynamic imperfections and helping the arrowhead fly like a field point, i.e. an arrowhead with no affixed blades. Upon impact with an object such as an animal, first blade 312 and second blade 313, responding to forces exerted on first opening lever 324 and second opening lever 325, respectively, pivot and slide to a deployed position (FIGS. 16 and 18), and may be substantially locked in the deployed position via pivot-limiter 317, thereby forming a broad cutting blade for promoting an increased rate of bleeding and a more humane kill. Further, when in the deployed position, the locked blades may pivot about pivot pin 316 relative to the arrowhead body, such as in a similar manner as described above with respect to arrowheads 10, 110, 210. After use, the blades may be manually pivoted outward to disengage them from the pivot-limiter, whereby the blades may be moved back to their undeployed position (and retained in the undeployed position via the retention or biasing forces provided by the resilient element) so the arrowhead is ready for another use.

Changes and modifications to the specifically described embodiments may be carried out without departing from the principles of the present invention, which is intended to be limited only by the scope of the appended claims as interpreted according to the principles of patent law.

The embodiments of the invention in which an exclusive property is claimed are defined as follows:

1. An arrowhead for use with an arrow in archery, said arrowhead comprising:

a body;

at least one blade pivotally mounted at said body, said at least one blade having a cutting edge and a rear edge, said rear edge having a notch, wherein said blade pivots relative to said body and about a pivot axis between a generally centered position and an angled position; and a retaining mechanism disposed at said body and engaging said notch when said blade is in the centered position, wherein said retaining mechanism is adapted to impede pivotal movement of said blade about the pivotal connection.

2. The arrowhead of claim 1, wherein said body further defines a substantially pointed portion.

3. The arrowhead of claim 1, wherein said retaining mechanism comprises:

an engaging element that engages said notch when said blade is in the centered position; and a biasing element adapted to act on said engaging element, wherein said biasing element urges said engaging element toward said rear edge and at least partially into said notch when said blade is in the centered position.

4. The arrowhead of claim 3, wherein said engaging element comprises a ball bearing.

5. The arrowhead of claim 3, wherein said biasing element comprises one of: (i) a coil spring and (ii) an elastomeric material.

6. The arrowhead of claim 1, wherein said retaining mechanism comprises a wheel rotatably attached to said body and adapted to engage said notch when said blade is in the centered position.

7. The arrowhead of claim 6, further comprising a bearing attached to said wheel to facilitate rotation of said wheel.

8. The arrowhead of claim 1, wherein said body further defines an externally threaded portion, said externally threaded portion being adapted to threadably attach the arrowhead to an arrow shaft.

9. The arrowhead of claim 1, wherein said body further defines a slot, said slot receiving said at least one blade therethrough.

10. The arrowhead of claim 1, wherein said at least one blade comprises at least two blades, and wherein each of said at least two blades pivot between respective undeployed positions and respective deployed positions, wherein said at least two blades interlock when in the respective deployed positions, and wherein said at least two blades are pivotable together about said pivot axis when interlocked.

11. The arrowhead of claim 1, wherein said body has a tip portion comprising a wider flared portion and a narrower flared portion, said wider flared portion being generally normal to said narrower flared portion.

12. An arrowhead for use with an arrow in archery, said arrowhead comprising:

a body;

at least two blades each pivotally connected at said body and pivotable about a pivot axis, said at least two blades defining a folded position wherein said blades are in substantial alignment with said body, and wherein said at least two blades are adapted to pivot about said pivot axis to a deployed position in response to an impact force;

wherein said at least two blades are substantially interlocked relative to one another when in the deployed position; *and* wherein said at least two blades are pivotable together about said pivot axis when interlocked in the deployed position[; and a retaining mechanism adapted to impede pivotal movement of said at least two blades about said pivot axis when said at least two blades are in the deployed position].

13. The arrowhead of claim 12, wherein said retaining mechanism engages a rear edge of said blades to impede pivotal movement of said at least two blades about said pivot axis.

14. The arrowhead of claim [13] *12*, wherein each of said at least two blades includes an interlocking tab, and said interlocking tabs are configured to lock said at least two blades in the deployed position.

15. The arrowhead of claim 13, wherein said retaining mechanism comprises:

an engaging element that engages a notch of said blades when said at least two blades are in the deployed position and in the centered position; and a biasing element adapted to act on said engaging element, wherein said biasing element urges said engaging element toward said rear edge and at least partially into said notch when said at least two blades are in the deployed position and in the centered position.

16. An arrowhead for use with an arrow in archery, said arrowhead comprising:

a body comprising a substantially pointed tip, a portion adapted to attach said arrowhead to an arrow shaft, and a slot;

at least one blade pivotally mounted at said body and received through said slot, said at least one blade having a pair of cutting edges and a rear edge, said rear edge having a notch, wherein said blade pivots relative to said body and about a pivot axis between a generally centered position and an angled position, and wherein said cutting edges extend laterally from said body at each side of said body when said blade is in said centered position;

a retaining mechanism disposed at said body, said retaining mechanism having an engaging element that engages said notch when said blade is in said centered position, and a biasing element urging said engaging element at least partially into said notch when said blade is in said centered position; and wherein said retaining mechanism impedes pivotal movement of said blade about said pivot axis while allowing pivotal movement of said blade about said pivot axis responsive to a force at one of said cutting edges being sufficient to overcome said retaining mechanism.

17. The arrowhead of claim 16, wherein said engaging element comprises one of a ball bearing and a wheel rotatably attached to said body.

18. The arrowhead of claim 16, wherein said at least one blade comprises at least two blades, and wherein each of said at least two blades pivot between respective undeployed positions and respective deployed positions, wherein said at least two blades interlock when in the respective deployed positions, and wherein said at least two blades are pivotable together about said pivot axis when interlocked.

19. An arrowhead for use with an arrow in archery, said arrowhead comprising:

a body;

at least two blades each movably connected at said body and pivotable about a pivot axis, said at least two blades defining a folded position wherein said blades are in substantial alignment with said body, and wherein said at least two blades are adapted to move along said body and pivot about said pivot axis to a deployed position in response to an impact force;

a retaining mechanism, wherein said at least two blades are substantially retained relative to one another by said retaining mechanism when in the deployed position; *and* wherein said at least two blades are pivotable together about said pivot axis when retained in the deployed position[; and wherein said retaining mechanism limits the range of pivotal movement of said at least two blades about said pivot axis when said at least two blades are in the deployed position].

20. The arrowhead of claim 19, wherein said retaining mechanism comprises:

a guide pin at said body; and a pivot limiting element, said pivot limiting element movably connected to said guide pin and retained at said body by said guide pin, said pivot limiting element having opposed ends and defining a channel for receiving said guide pin*;*

*wherein said retaining mechanism limits the range of pivotal movement of said at least two blades about said pivot axis when said at least two blades are in the deployed position*.

21. The arrowhead of claim 20, wherein each of said blades comprises a locking tab, and wherein said locking tabs of said blades engage said opposed ends of said pivot limiting element when said at least two blades are in the deployed position, wherein said retaining mechanism is adapted to limit the range of pivotal movement of said at least two blades about said pivot axis when said guide pin reaches one of said opposed ends of said channel of said pivot limiting element.

22. The arrowhead of claim 19, further comprising a resilient member at said body and positioned at a forward end of said slot, wherein said resilient member is adapted to engage forward portions of said blades when said blades are in an undeployed position, said resilient member initially resisting the deployment of said blades.

23. The arrowhead of claim 22, wherein said resilient member urges said blades toward and into engagement with a forward edge of said pivot limiting element to resist pivotal movement of said blades toward said deployed position.

* * * * *

UNITED STATES PATENT AND TRADEMARK OFFICE

CERTIFICATE OF CORRECTION

PATENT NO. : RE44,474 E
APPLICATION NO. : 13/355830
DATED : September 3, 2013
INVENTOR(S) : Douglas A. Vandewater It is certified that error appears in the above-identified patent and that said Letters Patent is hereby corrected as shown below:

In the Claims

Column 12

Line 41, Claim 13, after "The arrowhead of claim 12," insert --further comprising a retaining mechanism adapted to impede pivotal movement of said at least two blades about said pivot axis when said at least two blades are in the deployed position,--

Signed and Sealed this
Third Day of June, 2014

Michelle K. Lee

Michelle K. Lee
*Deputy Director of the United States Patent and Trademark Office*